Figure 1:
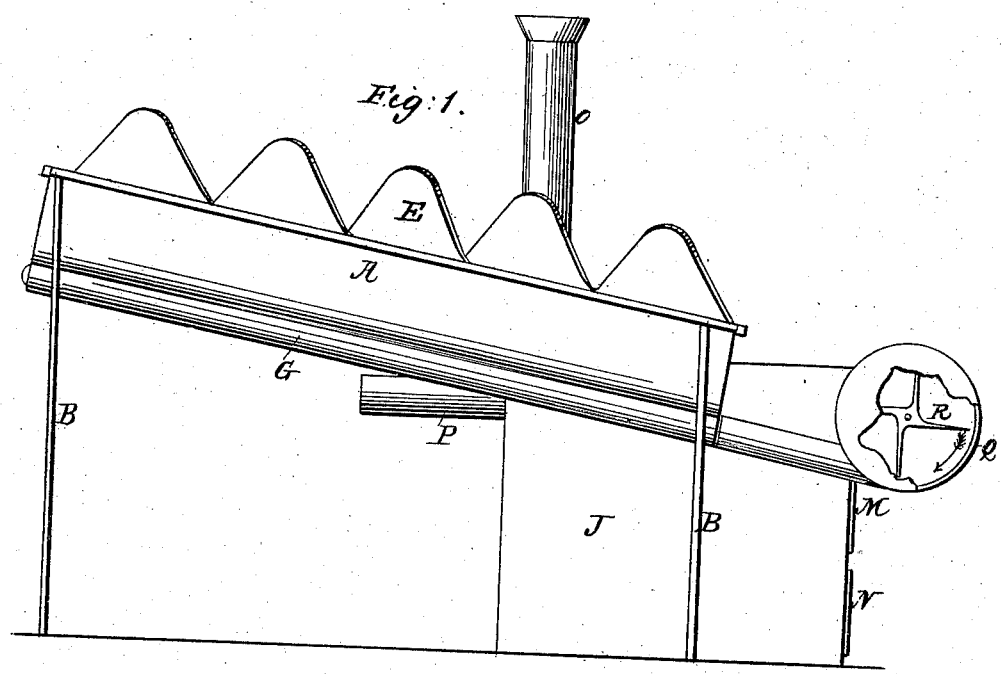

S. B. ROBINSON.

Grain Drier.

No. 11,140.

Patented June 20, 1854.

UNITED STATES PATENT OFFICE.

S. B. ROBINSON, OF OSWEGO, NEW YORK.

MACHINE FOR DRYING GRAIN.

Specification of Letters Patent No. 11,140, dated June 20, 1854.

*To all whom it may concern:*

Be it known that I, S. BROCKWAY ROBINSON, of Oswego, in the county of Oswego and State of New York, have invented a new and useful Machine for Drying Wet Wheat and Kiln-Drying Grain and other Articles; and I do hereby declare that the same is described and represented in the following specifications and drawings.

To enable others skilled in the art to make and use my invention I will proceed to describe its construction and operation, referring to the drawings in which the same letters indicate like parts in each of the figures.

Figure 2:
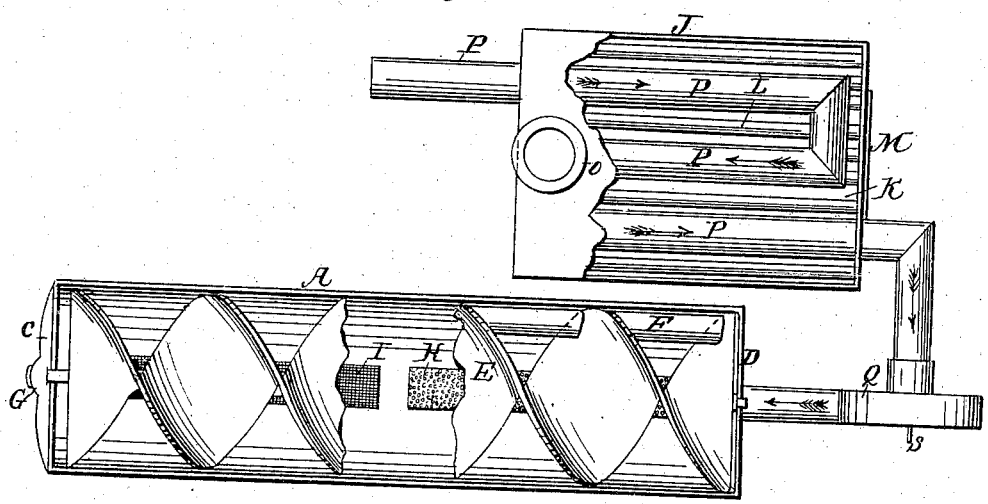

Figure 1, is an elevation of the machine. Fig. 2, is a plan. Some of the parts are represented as broken away in each figure to show some other parts more clearly.

In these drawings A is a semicircular metallic trough or case supported by the posts B B in the position represented or in such other position as may be preferred. The trough A is provided with an end C and bar D which are fitted to receive the gudgeons of the conveyer E made in the form represented, or such other form as may be desirable to stir the grain in the trough A and convey it as desired. The conveyer E has a float F fastened to it as represented, so as to agitate the grain more efficiently when it is heated the hottest, and a crank, pulley or gear may be applied to one of its gudgeons to turn it and agitate the grain as required.

The semicircular trough G is fastened to the under side of the trough A, so that the heated air forced into it will ascend through the holes H in the bottom of the trough A, among the grain to dry it; and also through the interstices in the woven wire I which constitutes a part of the bottom of the trough A over the trough G. The holes H and the interstices in the woven wire I should be made so small that the grain or materials being dried may not fall through them into the trough G.

J is a furnace which may be made of metal or masonry, provided with a fire space K, grate L and doors M and N opening into the fire space above the grate L and ash pit below it.

O is a chimney to conduct the smoke from the furnace.

The pipe P enters the furnace above the fire passing along near one side and back through the middle and then along near the other side and out at the opposite end and is connected to the fan case Q as represented. The fan R is made in the form represented, and may have a crank, pulley or gear applied to its shaft S to operate it and draw the air in through the pipe P which heats it as it passes along through the pipe, to the fan which is rotated in the direction of the arrow to force the hot air through the pipe T and trough G, through the bottom of the trough A in among the grain or other materials in the trough A to dry them as they are carried through the trough by the conveyer E which keeps the grain or other materials being dried constantly stirred so as to dry them uniformly without overheating or scorching any part thereof.

If the trough A is placed level the conveyer may be operated so as to convey the grain from one end to the other as required. But if the trough A is inclined the conveyer may be operated, so as to hasten or retard the progress of the grain through the trough as may be desirable; so as to dry the grain more or less, and regulate its passage through the trough in proportion to the temperature and force of the blast, and the condition of the grain passing through the machine. The grain may be supplied to the upper end of the trough A by a spout leading from a hopper or otherwise; and as it passes along through the trough and becomes heated and partially dried it is acted upon by the float F so as to stir it more as it gets hotter and drier before it escapes from the lower end of the trough into such receptacle as may be provided to receive it.

Although I have represented but one trough and conveyer of moderate length I contemplate that a long trough may be used or several short ones arranged so that the grain can be conveyed from one trough to another through the entire series by means of spouts, conveyers, elevators or otherwise, so as to dry very wet grain and make it fit for grinding at one operation, also that the bottom of the trough A may be made of bars of metal with spaces between them if preferred.

I am aware that several different kinds of machines have been constructed which are very expensive and very defective as they attempt to dry the grain too much confined in contact with heated surfaces of metal or other material without sufficient motion so that the moisture in the husk strikes into the kernel of the grain and stains it so that when it is ground it makes stained meal and flour which is certain to be scratched or marked and sold as damaged. But my invention remedies all the defects above enumerated and all others; for my machines can be made for less than half the cost to dry a given quantity of grain in less than half the time required by the old machines and with less than half the power and labor, without the risk of scorching or burning the grain. For with my machine the grain is constantly exposed to the air, and is dried by forcing hot air in among it (instead of moving it over heated surfaces) which hot air evaporates the moisture in the husk and absorbs and carries it off so as to prevent it from striking into the kernel and staining it; and if there is any water in the kernel it heats it and evaporates it so that it is forced out and conveyed away by the blast of hot air which is forced in among and through the grain in the trough. The air forced in among the grain at the lower end of the trough is hotter than boiling water, and might cook or scorch the grain which has been heated to a pretty high temperature in its passage from the upper end of the trough; if it was not stirred more violently than it is in the upper end where it enters the trough at a low temperature consequently there is no float required in the upper end of the conveyer like the float F at the lower end.

I contemplate that my apparatus for drying grain, etc., may be modified in various ways to suit the circumstances under which it is to be used and to adapt it to the materials to be dried without departing from the principles or merits of my invention.

What I claim as my invention and desire to secure by Letters Patent in the above described machine for drying grain and other articles, is—

A trough or cylinder with a perforated bottom provided with a conveyer or stirrer in combination with a blast of heated air forced through the perforated bottom above mentioned constructed and arranged substantially as described for the purposes set forth.

S. BROCKWAY ROBINSON.

Witnesses:
E. FITCH,
JAMES ELLS, Jr.